(No Model.) 2 Sheets—Sheet 2.

H. W. HAKES.
VEHICLE SEAT.

No. 591,840. Patented Oct. 19, 1897.

Witnesses.
H. Ward Bates
R. M. Washburn

Inventor
Hudson W. Hakes
by C. J. Washburn
Attorney

UNITED STATES PATENT OFFICE.

HUDSON W. HAKES, OF MILLBURY, MASSACHUSETTS.

VEHICLE-SEAT.

SPECIFICATION forming part of Letters Patent No. 591,840, dated October 19, 1897.

Application filed January 13, 1896. Serial No. 575,276. (No model.)

*To all whom it may concern:*

Be it known that I, HUDSON W. HAKES, a citizen of the United States, residing in Millbury, in the county of Worcester and Commonwealth of Massachusetts, have invented certain new and useful Improvements in Vehicle-Seats, of which the following is a specification.

My invention is of a device for mounting the seat upon a spring, within a frame-tube of the vehicle, the resiliency of which may be varied to meet the requirements of different individuals. This object I attain by the construction illustrated in the accompanying drawings of the seat applied to a bicycle, in which—

Figure 1:
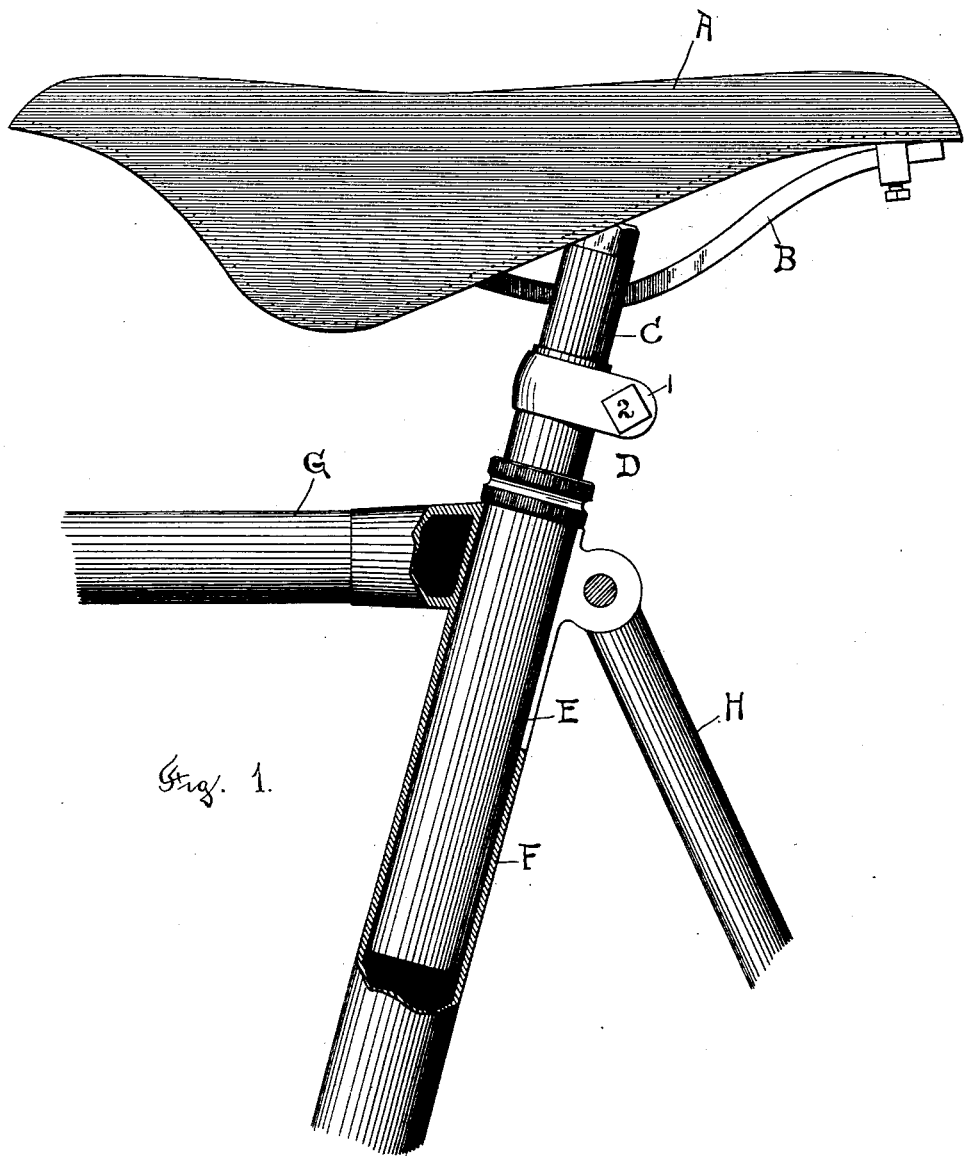
Figure 2:
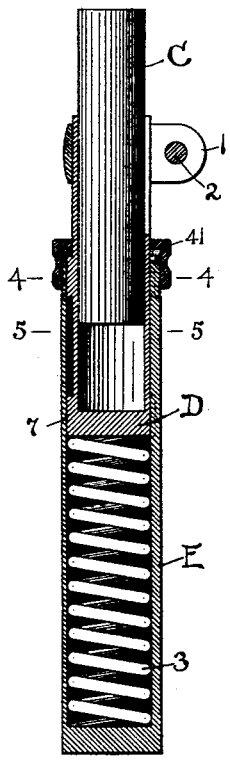
Figure 3:
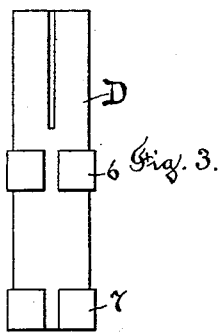
Figure 7:
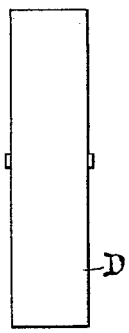
Figure 6:
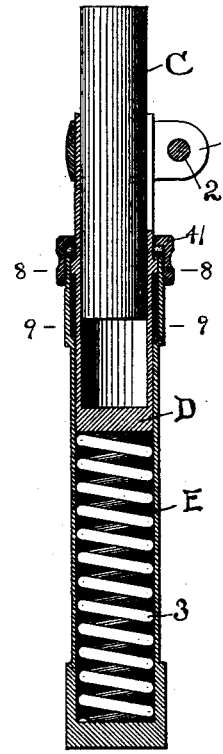
Figures 4, 8:
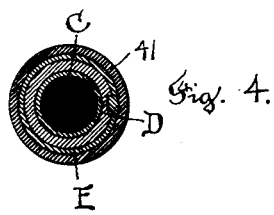
Figure 5:
Figure 9:
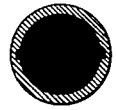

Figure 1 shows the seat and means for uniting it to the seat-post, which fits within a tube, which, in turn, is secured in an outer tube, which is contained within the frame-tube of the machine and secured to it in the usual manner. Fig. 2 is a view, partly in section, and discloses the seat-post and means for securing the latter within the tube contained within the frame-tube and the spring upon which the inner tube rests. Fig. 3 shows the tube which contains the seat-post which is slit for part of its length, in order that it may be firmly clamped upon the seat-post. Fig. 4 is a section on the line 4 4, Fig. 2. Fig. 5 is a section on line 5 5, Fig. 2, with the inner tube removed. Fig. 6 is a modified form of my device. Fig. 7 shows the tube in Fig. 6 which holds the seat-post, and corresponds with Fig. 3, the first form shown, excepting that the tube is in a different position. Fig. 8 is a section on line 8 8, Fig. 6. Fig. 9 is a section on line 9 9, Fig. 6.

For convenience I will, throughout the specification, speak of the plunger which carries the seat as the "seat-post," and the tube within which the seat-post is contained as the "inner tube," and the tube surrounding the latter and containing the resilient body as the "outer tube."

In the drawings, A is the seat, which is secured, through the spring B, to the seat-post C, which is held within the inner tube D, which is contained within the outer tube E, which is contained within the frame-tube F.

G and H are other members of the frame, which are of the usual form, connected in the usual manner, and are not a part of my invention.

The inner tube D may be slit for a part of its length and is embraced by the strap 1, which, by means of the bolt 2, may clamp the seat-post within the inner tube in any desired position, thus enabling the rider to raise or lower the seat to suit his convenience.

Within the outer tube is the coiled spring 3, which has a bearing upon the solid bottom of the outer tube. The inner tube D rests upon the spring, thus affording a resilient support for the seat. Surrounding the outer tube, and bearing upon an elevated surface upon the inner tube, is the thumb-nut 41, which not only binds the inner and outer tubes together and prevents the dislodgment of the seat-post, but, by having a bearing upon the elevated surface 6 of the inner tube, enables the operator, by raising or lowering the thumb-nut, to force the inner tube with greater or less force against the spring, thus varying the tension of the spring.

The elevated portions 6 7 of the inner tube, which may conveniently be produced by brazing rings upon the tube, contain a slot parallel to the main axis of the tube, adapted to fit upon a spline raised upon the inner surface of the outer tube E. This prevents the seat from revolving.

The construction may be best seen in Fig. 4, in which is shown, in cross-section, the thumb-nut, the outer tube with the spline, the inner tube with the slot, in which the spline fits, and the seat-post. The construction of the outer tube, taken by itself, may be seen in Fig. 5, where it is shown in cross-section.

The modification shown in Figs. 6, 7, 8, and 9 differs from the form last described, in that the inner tube (shown in Fig. 7) has two short splines upon its outer surface, adapted to engage with two slots made in the inner surface of the outer tube. The construction is best seen in Fig. 8, in which is shown in cross-section the thumb-nut, the outer tube with slots, the inner tube with splines adapted to engage with the slots, and the seat-post.

The construction of the outer tube, taken by itself, may be seen in Fig. 9, and when contrasted with Fig. 5 the difference between the two forms will be clearly seen.

The advantages of this device are readily seen. The spring may be dispensed with and a perfectly rigid seat secured, if occasion demands.

Having described my invention, what I claim as new, and desire to secure by Letters Patent, is—

1. In combination with the frame-tube of a vehicle, a tube containing a spring, an inner tube adapted to rest upon said spring, means for preventing the inner tube from turning within the outer tube, a thumb-nut which connects the outer and inner tubes and regulates the tension upon the spring, a seat-post within the inner tube, an adjustable strap encircling the inner tube, whereby the seat-post may be held at any desired height within the inner tube substantially as shown and described.

2. In combination with the frame-tube of a vehicle, a tube containing a spring, an inner tube, split for part of its length, adapted to rest upon said spring, a spline upon the inner surface of the outer tube, a slot upon the outer surface of the inner tube adapted to engage with said spline, a thumb-nut, which connects the outer and inner tubes, and regulates the tension upon the spring, a seat-post, within the inner tube, an adjustable strap encircling the inner tube, whereby the seat-post may be held at any desired height within the inner tube, substantially as shown and described.

HUDSON W. HAKES.

Witnesses:
R. M. WASHBURN,
C. G. WASHBURN.